(12) United States Patent
Peinelt et al.

(10) Patent No.: US 7,506,671 B2
(45) Date of Patent: Mar. 24, 2009

(54) MULTI-SIZE TIRE FILLING APPARATUS AND METHOD

(75) Inventors: Andreas Peinelt, Pfungstadt (DE); Martin Rogalla, Darmstadt (DE); Werner Lehr, Modautal (DE); Roland Lehmann, Darmstadt (DE)

(73) Assignee: Schenck RoTec GmbH, Darmstadt (DE)

( * ) Notice: Subject to any disclaimer, the term of this patent is extended or adjusted under 35 U.S.C. 154(b) by 594 days.

(21) Appl. No.: 11/305,466

(22) Filed: Dec. 15, 2005

(65) Prior Publication Data

US 2006/0136288 A1 Jun. 22, 2006

(30) Foreign Application Priority Data

Dec. 20, 2004 (DE) .................. 10 2004 062 329

(51) Int. Cl.
*B65B 31/00* (2006.01)
(52) U.S. Cl. .................. 141/38; 141/164; 141/181; 141/367; 157/1.17; 157/1.2
(58) Field of Classification Search ............. 141/38, 141/129, 144, 164, 181, 367, 387, 177; 137/223; 157/1.2, 1.17, 1.24, 1.26

See application file for complete search history.

(56) References Cited

U.S. PATENT DOCUMENTS

| | | | | |
|---|---|---|---|---|
| 2,874,760 A * | 2/1959 | Bishop | .................. | 157/1.1 |
| 2,900,015 A | 8/1959 | Harrison | | |
| 2,936,827 A * | 5/1960 | Riggs | .................. | 157/1.1 |
| 3,016,934 A * | 1/1962 | Smyser | .................. | 157/14 |
| 3,528,474 A * | 9/1970 | May | .................. | 157/1.1 |
| 3,700,021 A | 10/1972 | Motis | | |
| 3,774,664 A * | 11/1973 | Matysak | .................. | 157/1.1 |
| 3,783,928 A * | 1/1974 | Lee | .................. | 157/1.1 |
| 3,851,695 A * | 12/1974 | Kimberly | .................. | 157/1.1 |
| 3,866,654 A * | 2/1975 | Duquesne | .................. | 157/1.1 |
| 3,978,903 A | 9/1976 | Mueller et al. | | |
| 4,183,392 A * | 1/1980 | Kane | .................. | 157/1.1 |
| 4,226,275 A * | 10/1980 | Robins | .................. | 157/1.2 |
| 4,699,185 A * | 10/1987 | Cargould et al. | .................. | 141/1 |

(Continued)

FOREIGN PATENT DOCUMENTS

DE           34 23 307        1/1986

(Continued)

*Primary Examiner*—Timothy L Maust
*Assistant Examiner*—Jason K Niesz
(74) *Attorney, Agent, or Firm*—W. F. Fasse; W. G. Fasse

(57) ABSTRACT

A tire filling apparatus preferably includes a support and seal arrangement on which a wheel-tire combination is supported in a horizontally lying orientation, a tire filling plate, and a plurality of differently-sized tire filling rings. Based on the diameter of the wheel-tire combination to be filled with air, a properly sized one of the filling rings is selected and positioned coaxially along the wheel axis between the tire and the filling plate. The filling plate moves toward the tire, sealingly contacts the filling ring, and presses the filling ring against the upwardly facing tire sidewall, until an open air filling gap is formed between the tire sidewall bead and the wheel rim. Pressurized air is introduced through the filling plate, the filling ring, and the open air filling gap into the tire interior, until the gap is closed by the increasing air pressure in the tire.

40 Claims, 7 Drawing Sheets

U.S. PATENT DOCUMENTS

| | | | |
|---|---|---|---|
| 4,735,250 A | 4/1988 | Kane | |
| 4,947,919 A | 8/1990 | Timlin | |
| 5,035,274 A | 7/1991 | Kinnick et al. | |
| 5,072,765 A * | 12/1991 | Kane et al. | 157/1.1 |
| 5,094,284 A * | 3/1992 | Curcuri | 157/1.17 |
| 5,141,040 A * | 8/1992 | Curcuri | 157/1.17 |
| 5,146,969 A | 9/1992 | Kawabe et al. | |
| 5,170,828 A * | 12/1992 | Curcuri | 157/1 |
| 5,415,218 A * | 5/1995 | Shibazaki | 157/1.2 |
| 5,657,673 A * | 8/1997 | Fukamachi et al. | 157/1.17 |
| 6,029,716 A | 2/2000 | Hawk | |
| 6,076,586 A * | 6/2000 | Hans | 157/1.17 |
| 6,148,892 A * | 11/2000 | Koerner et al. | 157/1.1 |
| 6,176,288 B1 * | 1/2001 | Kane et al. | 157/1 |
| 6,463,982 B1 * | 10/2002 | Doan | 157/1.1 |
| 6,467,524 B2 | 10/2002 | Ronge et al. | |
| 6,502,618 B1 | 1/2003 | Kane et al. | |
| 6,675,857 B2 * | 1/2004 | Kimbara et al. | 157/1 |
| 6,736,170 B2 * | 5/2004 | Eriksen et al. | 141/38 |
| 6,918,423 B2 * | 7/2005 | Pellerin et al. | 157/1.2 |
| 7,044,188 B2 * | 5/2006 | Pellerin et al. | 157/1.17 |
| 2001/0013396 A1 * | 8/2001 | Ronge et al. | 157/1.17 |
| 2004/0140058 A1 * | 7/2004 | Pellerin et al. | 157/1.2 |
| 2005/0006031 A1 * | 1/2005 | Pellerin et al. | 157/1.17 |

FOREIGN PATENT DOCUMENTS

| | | |
|---|---|---|
| DE | 198 01 455 | 7/1999 |
| DE | 100 07 019 | 8/2001 |

* cited by examiner

MULTI-SIZE TIRE FILLING APPARATUS AND METHOD

PRIORITY CLAIM

This application is based on and claims the priority under 35 U.S.C. §119 of German Patent Application 10 2004 062 329.5, filed on Dec. 20, 2004, the entire disclosure of which is incorporated herein by reference.

FIELD OF THE INVENTION

The invention relates to a tire filling station for filling pressurized air into a pneumatic wheel-tire combination comprising a tire mounted on a wheel rim, such as a mounted motor vehicle tire. The tire filling station is adaptable to different sizes of tires. The invention further relates to a method of filling a tire by filling air through an annular gap between the tire sidewall bead and the wheel rim, whereby the method is also adaptable to different sizes of tires.

BACKGROUND INFORMATION

In the high volume series production of motor vehicles on an assembly line, air-filled mounted tires or wheel-tire combinations comprising a tire mounted on a wheel rim, are prepared in a tire mounting production line and are then transported to the motor vehicle assembly line, where they are mounted on the respective motor vehicle. To prepare a mounted tire or wheel-tire combination, first the tire is loosely mounted on the wheel rim, and this assembly is then delivered to a tire filling station where the wheel-tire combination is inflated or filled with air. Then the inflated wheel-tire combination is generally tested for its running characteristics or any existing unbalance condition, and is generally also subjected to a balancing operation. In this regard, the tire filling station may be a component of the tire mounting system and/or of the wheel balancing system. The finished mounted tire or wheel-tire combination is then delivered from the tire production line to the assembly line for the assembly of the motor vehicle, where the wheel-tire combinations are mounted on the motor vehicles.

In the above context, mounted wheel-tire combinations having different diameters must be processed through the tire production line, especially when different vehicles are being assembled along the vehicle assembly line. It is thus important that the equipment of the tire production line, including the tire filling station, is adaptable to wheels or tires having various different diameters to achieve an efficient production and economy of the capital investment in the tire filling station.

A conventional tire filling station and tire filling method of a type generally described above are known from the German Patent DE 100 07 019 and the counterpart U.S. Pat. No. 6,467,524 (Ronge et al.—October 2002). According to this patent reference, the loosely assembled wheel-tire combination is delivered into the tire filling station so that one of the sidewall surfaces of the tire is oriented facing downwardly and makes sealing contact on a support plate. In other words, the tire lies flat on its side on the support plate. A tire filling bell of the tire filling station is arranged above the upper side of the horizontally lying wheel-tire combination. To inflate or fill the tire, the tire filling bell is lowered until the free bottom ring-shaped edge rim of the tire filling bell presses downwardly against the tire sidewall, and then continues to press the tire sidewall downwardly away from the wheel rim, so that an annular gap or space is formed between the tire sidewall bead and the wheel rim. Pressurized air is then filled through the filling bell and through the annular gap between the tire sidewall and the wheel rim into the inner space of the wheel-tire combination. As the air pressure builds up within the tire, the air pressure expands the tire, and thereby pushes the tire sidewall outwardly or upwardly into sealing contact with the wheel rim, while closing the above mentioned annular gap.

Further according to the above mentioned patent reference, the apparatus actually comprises two tire filling bells or rings of different diameters, which are arranged concentrically nested within one another and axially slidably relative to one another. Thereby, either one of the filling rings (respectively having different diameters) can be selected, to better match the diameter of the wheel-tire combination that is to be filled. Thus, the single apparatus can be used to fill different sizes, i.e. different diameters, of tires and/or wheel rims.

In practice, each one of the two filling rings of the conventional apparatus is typically used to fill respective wheels having three different successive rim sizes. Thus, with the two different sizes of filling rings, the known apparatus can be used to fill a total spectrum of six different sizes, i.e. diameters, of mounted tires. Efficiency and economy of operation in the use of such tire filling stations requires that a single station must be able to service the greatest possible number of different wheel-tire sizes. Furthermore, purchasers of such tire filling stations are requiring ever higher levels of quality with respect to the accuracy and reproducibility of the tire inflation pressure achieved by the tire filling stations. It has been found in practice, however, that these increasing quality demands cannot always be satisfied if three different successive rim sizes of wheels/tires are to be serviced with a single tire filling bell or ring, because the precision of the size match is not sufficient and the accuracy of the resulting tire inflation pressure is thereby impaired.

An earlier conventional tire filling apparatus of the above-mentioned general type, without size adaptability, is disclosed in U.S. Pat. No. 4,947,919 (Timlin—August 1990).

Another conventional size-adjustable tire filling station includes a wheel rim seal ring, for sealing against the wheel rim to close off the interior space of the wheel rim during the tire filling process, for example as disclosed in the German Patent DE 198 01 455.

The entire disclosures of the two abovementioned U.S. Pat. Nos. 6,467,524 and 4,947,919 are incorporated herein by reference.

SUMMARY OF THE INVENTION

In view of the above, it is an object of invention to provide a tire-filling method and apparatus with simple measures to achieve a high inflation or filling accuracy as well as a good reproducibility of the achieved inflation pressure in wheel-tire combinations of different sizes or dimensions. It is another object of the invention to be able to service the greatest possible number of different sizes or dimensions of wheel-tire combinations with a single tire filling station. Still another object of the invention is to provide an increased precision of matching the size of the tire filling bell or ring to the particular size of the wheel-tire combination that is to be filled. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in a tire filling apparatus for filling pressurized air into a wheel-tire combination including a tire mounted on a wheel rim. The tire filling apparatus or station comprises a tire filling bell that includes a filling chamber member (for example comprising a filling ring) that can be moved into a centered position coaxially aligned with the axis of the wheel-tire combination, and a separate air feed and pressing member (for example comprising a tire filling plate) that is movable along the axis of the wheel-tire combination so as to sandwich and press the filling chamber member (e.g. the tire filling ring) between the air feed and pressing member (e.g. the tire filling plate) and the sidewall of the tire. Thus, two opposite openings of the filling chamber member respectively press and seal against the tire sidewall on the one hand, and against the air feed and pressing member on the other hand.

The filling ring may be a simple annular cylindrical sleeve or pipe section with two opposite open ends thereof forming the two opposite openings. Alternatively, the filling ring may include an annular cylindrical ring wall or sleeve as well as an at least partially closed top cap, forming an inverted bowl or dome shape of the overall filling ring. The ring wall has an open end bounded by the wall's bottom edge rim at the bottom thereof forming one of the openings to cooperate with the tire sidewall, and the top cap has the other opening therein to cooperate with the air feed and pressing member or tire filling plate. Generally the term "tire filling ring" includes both of the abovementioned embodiments.

Preferably, the tire filling plate is first movable against the top of the tire filling ring, so that the plate and the ring together form a closed tire filling bell, and then the plate and the ring move in common together to bring the bottom end of the ring into contact with the tire sidewall.

Further preferably, the tire filling station includes a plurality of tire filling rings respectively having different diameters, whereby these filling rings are movable along a circular or linear path perpendicular to the axis of the wheel-tire combination so as to selectively bring any selected one of the tire filling rings into a centered position on the axis of the wheel-tire combination. For this purpose, preferably, the filling rings are movably carried by a filling ring selection and motion apparatus, preferably embodied as a rotatable turret or carousel to selectively rotate the appropriately sized filling ring into position for filling a respective wheel-tire combination. Each respective tire filling ring is preferably slidably mounted on the rotatable carousel so as to be linearly slidable parallel to the axis of the wheel-tire combination. The tire filling ring is preferably urged or biased away from the wheel-tire combination by a spring device, and pushed toward the wheel-tire combination against the spring force by the driven motion of the tire filling plate.

In a further preferred embodiment, the tire filling station additionally includes a tire support and seal arrangement including a support and seal surface on which the downwardly facing tire sidewall is supported and sealed. Preferably, the support and seal arrangement includes a plurality of partial plates that are contacted and sealed against one another to form the support and seal surface on which the downwardly facing tire sidewall is supported and sealed.

The above objects have also been achieved according to the invention in a method of inflating or air-filling a wheel-tire combination, including steps of moving a tire filling ring into a centered position along the axis of the wheel-tire combination, moving and contacting a tire filling plate against one opening at one end of the tire filling ring, moving the plate and the ring (preferably in common together) along the axis of the wheel-tire combination in order to contact and press another opening at the opposite end of the tire filling ring against the tire sidewall and thereby press the tire sidewall away from the wheel rim so as to form an annular air gap therebetween. The method then further involves supplying pressurized air through the tire filling ring and the annular air gap into the interior space of the wheel-tire combination so as to inflate the tire.

The method further preferably comprises a preliminary step of selecting a particular tire filling ring having the most suitable size among several differently-sized filling rings, for filling a wheel-tire combination having a particular size or diameter. This selected tire filling ring is then moved into the centered position along the wheel-tire axis before being contacted and pushed by the tire filling plate.

The invention is generally based on the recognition that the size difference or spacing distance between the outer diameter of a wheel rim and the inner diameter of a filling bell used to fill the tire mounted on this wheel rim is the critical value or parameter determining the resulting accuracy of the tire inflation pressure achieved in the finally inflated tire. Namely, the smaller that this size difference or spacing gap is, the better will be the accuracy of the tire inflation pressure. This particularly means that the achieved air pressure can be more accurately reproduced from one tire to the next, and that a particular desired or target air pressure can be more accurately achieved for each given tire.

In the ideal case, an individual fitting or size-matched tire filling bell would be provided for each individual wheel rim or tire size. This ideal case is, however, not practical considering the great number of different wheel-tire sizes that must actually be serviced. Nonetheless, the invention comes sufficiently close to the ideal case, in order to achieve an adequate accuracy and reproducibility of the tire air pressure.

For this reason, the invention very well satisfies the two contrary demands, namely the ability to service a great number of different wheel-tire sizes on the one hand, and the need to ensure a good accuracy of the achieved tire air pressure on the other hand.

The inventive solution of the above objects and problems avoids the relatively complicated previous approach using plural concentrically nested filling bells. Instead, the inventive arrangement provides a single filling plate or air feed and pressing member together with a plurality of differently-sized filling rings or filling chamber members, of which any one can be selected and moved into position to cooperate with the filling plate so as to together form a size-adapted closed or complete filling bell. More particularly, the filling plate extends along a plate plane perpendicular to the wheel-tire axis, and is movable along the wheel-tire axis. Thereby the filling plate presses and seals against the opening at the upper end of the filling ring to form a closed or complete filling bell therewith. As this filling bell moves farther in the axial direction toward and against the tire sidewall, the other opening, e.g. bounded by the bottom edge of the filling ring, presses the tire sidewall away from the wheel rim to form an annular air gap therebetween. Then, pressurized air is filled through the filling bell and the opened air gap into the interior of the wheel-tire combination.

By providing a relatively great number of differently-sized filling rings, e.g. preferably six different filling rings, in a single tire filling station according to the invention, this provides a good size matching precision, i.e. the ability to closely match the size of the selected filling ring to the size of the wheel-tire combination that is to be filled. It has been unexpectedly and surprisingly found that a very good tire inflation pressure accuracy can already be achieved if one filling bell or filling ring with a certain opening diameter is used for filling wheel-tire combinations having either of two successive wheel rim sizes. In other words, each filling ring can be used to fill two different successive wheel-tire sizes. Thus, the preferred set of six filling rings having different diameters can be used to service a total of twelve different wheel-tire sizes, which covers a standard wheel rim size range from 13 inches to 24 inches, i.e. including twelve successive standard wheel rim sizes that each differ successively by one inch. In this regard, the successive diameters of the tire filling rings differ by two inches from one another, and each will be used to service the next larger and the next smaller wheel rim size. Thereby, the invention makes it possible to fill wheel-tire combinations covering the entire wheel size spectrum of wheels available in the ordinary market for automobiles, using a single tire filling station and achieving the required accuracy and reproducibility of the filled tire air pressure.

The arrangement of the several filling rings along a circular line or path about the hub of a carousel rotation arrangement is an extremely simple, robust and effective embodiment for selecting and moving any required individual one of the filling rings into the operating position to cooperate with the single filling plate. This arrangement is especially simple if the hub of the carousel arrangement is rotatably arranged on an existing column of the apparatus that is necessarily provided to connect together the upper part and the lower part of the machine frame thereof.

The arrangement of the filling rings on a linear motion arrangement makes it possible to effectively utilize the available space above the linear transport path of the wheel-tire combinations in an especially space-saving manner. This results in an overall compact construction of the tire filling station.

The axial slidability of the filling rings, i.e. the slidability thereof parallel to or along the wheel-tire axis, under the influence of the biasing force applied by a spring ensures the defined positioning and a secure contact of the selected filling ring against the filling plate. It is thereby not necessary to provide an active drive for moving the individual filling ring. Instead, merely the filling plate needs to be driven, and pushes the filling ring against the biasing return force applied by the spring arrangement. The spring arrangement may comprise one or more mechanical springs, elastic spring members, or pressurized air cylinder mechanisms. The filling rings are preferably each supported by an elastic suspension to allow a slight tilting and lateral shifting adjustment of each respective filling ring, so as to compensate for any radial off-axis or angular off-plane misalignments of the filling plate and the respective filling ring as the filling plate comes into contact with and presses and seals against the opening at the top side or end of the filling ring. The air feed and pressing member of filling plate preferably includes a conical centering section that tapers conically downward and is dimensioned to fit into the opening at the top of the filling ring. Thereby, the conical mating or plugging-in of the conical centering section into the top opening of the filling ring aids in centering the two components coaxially with one another, and then "locks" the two components to each other in a positive form-fitting manner in the coaxially aligned condition.

BRIEF DESCRIPTION OF THE DRAWINGS

In order that the invention may be clearly understood, it will now be described in connection with an example embodiment thereof, with reference to the accompanying drawings, wherein.

DETAILED DESCRIPTION OF PREFERRED EXAMPLE EMBODIMENTS AND THE BEST MODE OF THE INVENTION

Figure 1:
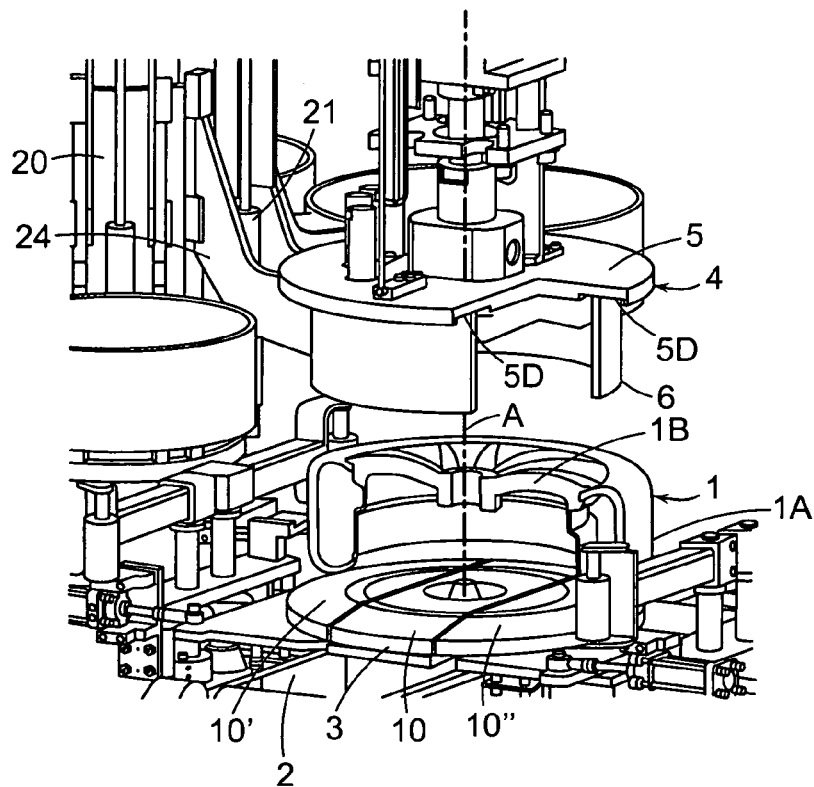
FIG. 1 is a perspective view of an embodiment of a tire filling station or apparatus according to a first embodiment of the invention.
Figure 12:
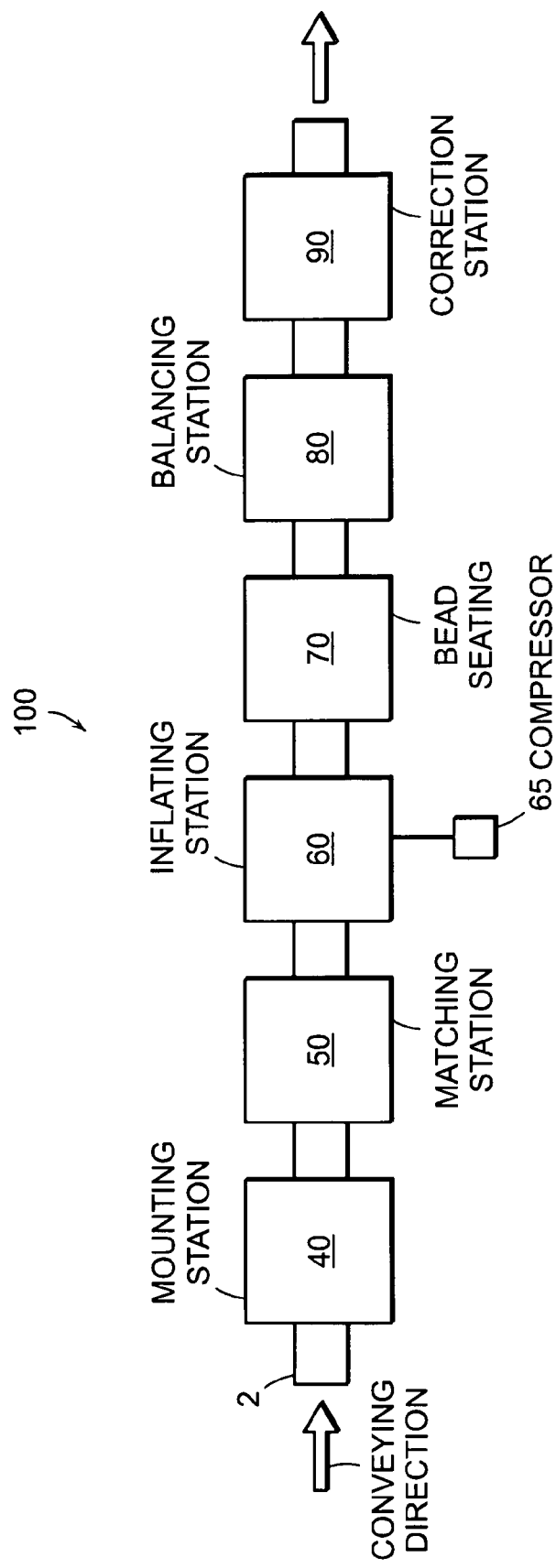
FIG. 12 is a schematic top plan diagram of an overall tire mounting, inflating and balancing system including the tire filling or inflating station according to the invention.

In a tire mounting, inflating and balancing system 100 shown generally in FIG. 12, a tire 1A is loosely mounted on a wheel rim 1B in a tire mounting station 40 in any conventionally known manner, to form thereof a mounted tire or wheel-tire combination 1, which is then transported in a non-pressurized state, by means of a transport apparatus 2, from the tire mounting station 40 to a matching station 50, and from there to a tire filling or inflating station 60 according to the invention, which is shown in detail in FIG. 1. There, the wheel-tire combination 1 is then supported on a support and seal arrangement 3 of the filling station 60. The filling or inflating station 60 further includes a tire filling bell or dome 4 through which pressurized air is provided to fill the tire, i.e. to carry out the tire filling process. A compressor 65 and/or an air tank 5C supply the required pressurized air. After the tire has been inflated, the transport apparatus 2 further transports the filled wheel-tire combination 1 away from the tire filling station 60 and an associated bead seating station 70 to, for example, an unbalance measuring station and/or a balancing station 80. Thereafter, any detected unbalance can be corrected in a correcting station 90. These stations can be respectively embodied as individual modules or separate stations that each respectively comprise a separate individual machine frame. Alternatively, a single common machine frame can be provided for various stations, which thereby form an integrated tire mounting and filling system 100.

Figure 2:
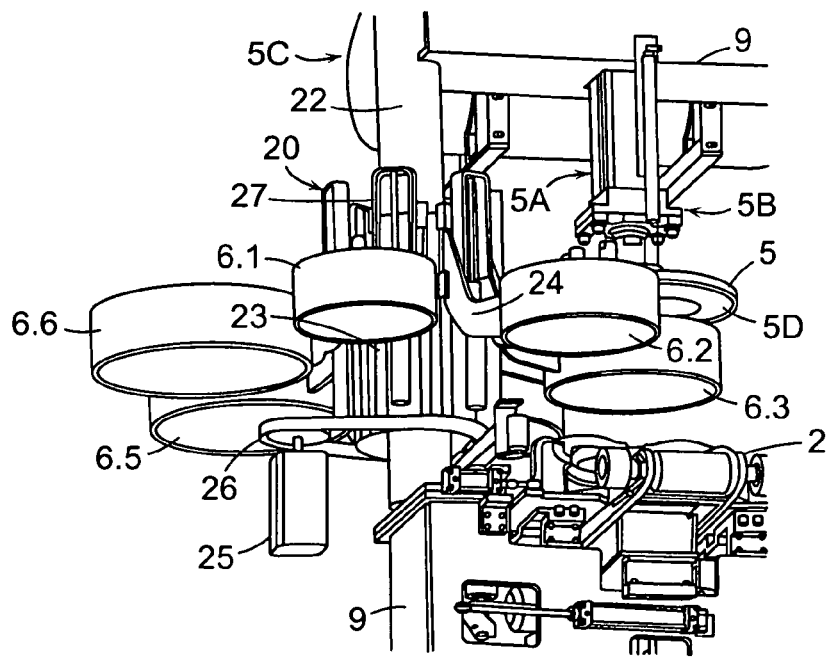
FIG. 2 is another perspective view of the tire filling station or apparatus according to FIG. 1, especially showing the turret or carousel rotation arrangement carrying plural differently-sized filling rings.

Referring more particularly to FIGS. 1 and 2, the transport apparatus 2 comprises two transport conveyor devices that respectively run along a horizontal transport plane in a transport direction and that are spaced apart from one another perpendicular to the transport direction. The two transport conveyor devices may, for example, be embodied as conveyor chains or conveyor belts, which are suitably movably supported on a machine frame 9. These transport conveyor devices respectively run on the two opposite sides of the rotation axis of the wheel-tire combination 1, i.e. the wheel-tire axis A. This axis A extends preferably vertically and perpendicular or normal to the transport plane. In other words, the wheel-tire combination 1 is lying on its side, in a horizontal lying position, as it is transported and serviced in the tire filling process.

During the transport phase, the wheel-tire combination 1 is resting on and supported by diametrically opposed portions of the wheel rim side surfaces or tire sidewall surfaces on the two respective transport conveyor devices. In a lifting step conveying process, the transport conveyor devices lift up and transport a respective wheel-tire combination 1 into the tire filling station until the wheel-tire combination 1 is located centrally under the tire filling bell 4. Then, the transport apparatus 2 is lowered, so as to lower the wheel-tire combination 1 onto the central plate-shaped part 10 or support and seal plate 10 of the support and seal arrangement 3. Particularly, the two transport conveyor devices of the transport apparatus 2 are lowered down until they are completely recessed in respective receiver recesses of the machine frame 9.

In the present embodiment, the central plate-shaped part 10 is supported on the machine frame 9 and has an elongated shape that extends with a dimension in the transport direction that is larger than the diameter of the support or contact surface of the largest wheel-tire combination 1 that is to be filled using this filling station. In this manner, a stable and solid support of all expected wheel-tire combinations 1 is achieved on the central part 10. Preferably, the support and seal arrangement 3 is constructed in a multi-part embodiment that further comprises two additional plate-shaped parts 10' and 10" that are arranged laterally spaced away from the central part 10 on both respective sides of the motion path of the transport apparatus during the transport phase. This provides the required clearance for the transport apparatus 2 during the transport phase.

After the transport apparatus 2 has been lowered and the wheel-tire combination 1 has been deposited onto the central part 10, then the two lateral parts 10' and 10" are moved inwardly toward one another and toward the central part 10 located therebetween, by sliding in the support plane in a direction perpendicular to the transport direction. Thereby, the lateral parts 10' and 10" slide over the receiver recesses in which the lowered transport devices have been recessed, until the two lateral parts 10' and 10" are slidingly pushed against, and into sealed contact with, respective mating edges of the central part. The adjoining or mating parts 10, 10' and 10" of the support and seal arrangement 3 are provided with respective seal devices along their mating edges. Thereby, an air-tight seal is ensured, to form a closed support and seal surface for the wheel-tire combination 1 on the support and seal arrangement 3.

The overall support and seal arrangement 3 preferably has a circular plan view shape. Thereby, the central part 10 has a substantially rectangular shape (but e.g. with rounded or arced ends), while the two lateral parts 10' and 10" have respective circular segment shapes. In any event, the dimension of the support and seal arrangement 3 in the support plane perpendicular to the transport direction is greater than the diameter of the contact or support surface of the largest wheel-tire combination 1 that is to be filled using the filling station.

The specific features of the tire filling station relating to the transport apparatus 2 and the support and seal arrangement 3 can be in accordance with any conventionally known teachings of such apparatuses. Namely, the present invention is not limited to particular features of the transport apparatus or of the support and seal arrangement, except as expressly stated and claimed herein. Instead, the significant aspects of the present invention especially relate to the construction, arrangement, and operation of the tire filling bell 4.

Most basically, the tire filling bell 4 is embodied and constructed in a multi-part manner according to the present invention, and is essentially formed of a combination of an air feed and pressing member (e.g. embodied as a tire filling plate 5) and a filling chamber member (e.g. embodied as a tire filling ring 6). In a first embodiment, the tire filling ring 6 is essentially simply an annular cylindrical shell or pipe section. The tire filling ring 6 may be any respectively selected one tire filling ring among an available plurality of differently-sized ones of such tire filling rings 6.1, 6.2, 6.3, 6.4, 6.5, and 6.6. The filling plate 5 and the filling ring 6 may respectively be constructed of steel or some other suitable metal, or any other known or future developed material suitable for the intended purpose. The filling plate 5 and/or the filling ring 6 may be provided with a seal layer or a seal ring, e.g. 5D, on a face of the plate 5 and/or on an end edge or rim of the ring 6, to achieve an air-tight seal where these two components meet to form the tire filling bell 4 as will be explained below.

The tire filling plate 5 is oriented with its plate plane extending perpendicular or normal to the wheel-tire axis A, at a position above the support and seal arrangement 3. In the illustrated example embodiment, the filling plate 5 has a circular plate shape and is arranged centered coaxially on the wheel-tire axis line A. The filling plate 5 is movably connected to and supported relative to the machine frame 9, so as to be movable along the wheel-tire axis A relative to the wheel-tire combination 1 that is supported lying on the support and seal arrangement 3. For example, the filling plate 5 is supported and movably driven in a fluid-operated manner, such as by a pneumatic or hydraulic piston-cylinder arrangement 5A connected to the machine frame 9. Furthermore, the filling plate 5 has an air fill opening communicating therethrough, and is connected to a pressurized air supply conduit such as a pipe or hose 5B, to supply the pressurized air necessary for filling the wheel-tire combination 1. The pressurized air is supplied, for example, from a compressed air tank 5C or the like, connected via the conduit 5B to the filling plate 5.

Figure 3:
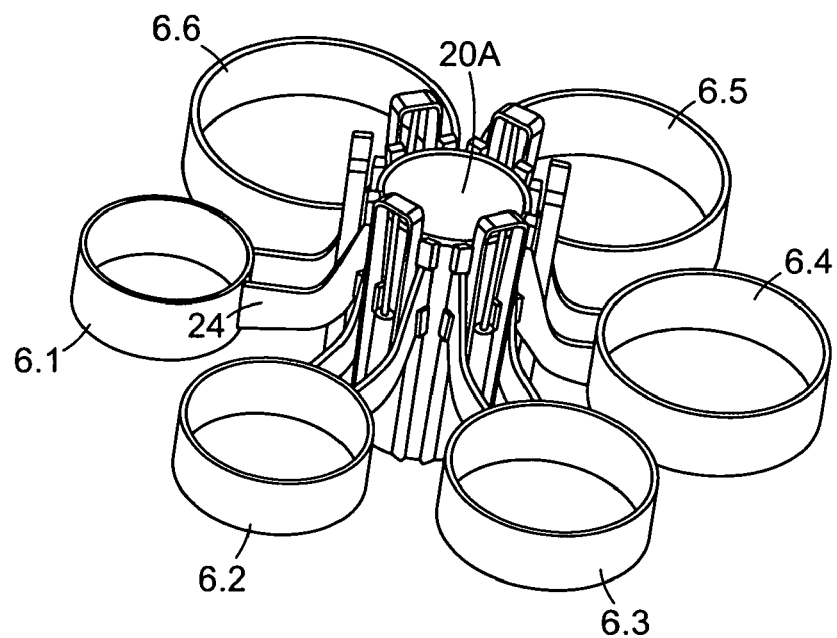
FIG. 3 is a perspective view of the carousel rotation arrangement carrying the filling rings, by itself as a detailed view.
Figure 4:
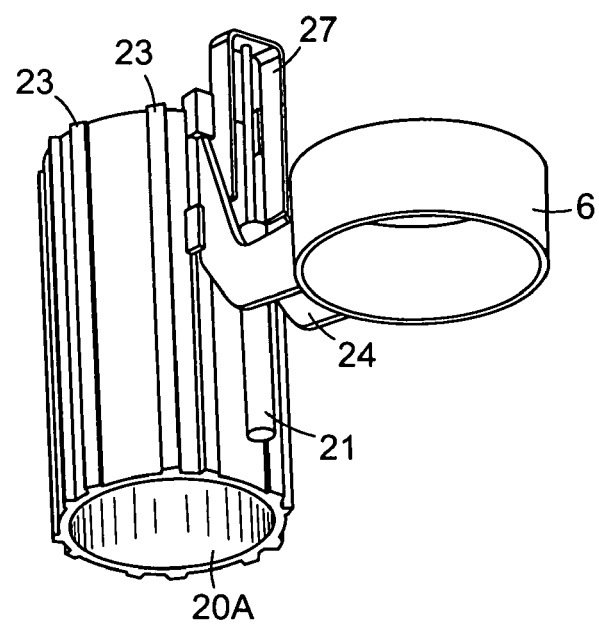
FIG. 4 is a perspective detailed view of a single filling ring carried by the carousel rotation arrangement.

In the position and operating stage shown in FIG. 1, the filling plate 5 is positioned above the wheel-tire combination 1, and is ready to begin the tire filling process. In the illustrated stage, the filling plate 5 already contacts the upper edge or rim of the filling ring 6 in an air-tight sealed manner (e.g. via a seal ring 5D), so that the filling ring 6 and the filling plate 5 together form the functional tire filling bell 4. This particular filling ring 6 has been selected as the appropriately sized filling ring 6 among a plurality of six differently-sized filling rings 6.1 to 6.6 (see FIGS. 2 and 3). Particularly, this respective filling ring 6 has been selected with respect to its diameter dependent on the wheel rim outer diameter of the wheel-tire combination 1 that is to be filled, so that an annular gap no larger than a prescribed limit, and preferably having a particular prescribed size, exists between the outer diameter of the wheel rim 1B being processed and the inner diameter of the particular selected filling ring 6.

In this regard, the diameters of the provided filling rings 6.1 to 6.6 are particularly designed so that each respective filling ring 6 can be used for filling respective wheel-tire combinations 1 having two different successive wheel rim sizes among a typical series of different wheel sizes, for example successive wheel rim sizes having diameters that differ from one another by one inch. Thereby, a sufficient precision of the matching of the filling ring to the wheel rim diameter is achieved, i.e. the arising annular gap mentioned above is maintained below the maximum limit, to ensure a sufficient accuracy and reproducibility of the resulting tire air pressure of the inflated wheel-tire combination. In this regard, the several filling rings 6.1 to 6.6 preferably have successive diameters that differ by two inches from one another, and the maximum difference between the outer diameter of the wheel rim and the inner diameter of the filling ring to be used for the filling process is no more than two inches, i.e. the above mentioned annular gap measures no more than one inch. It has been found, through the present invention, that this achieves an acceptable high accuracy and reproducibility of the resulting inflated tire air pressure.

In order to provide for the selection of any one filling ring 6 among the plurality of filling rings 6.1 to 6.6, the inventive tire filling station further includes a filling ring selection and motion apparatus 20 that carries all of the filling rings 6.1 to 6.6 and allows any selected one of the filling rings to be moved into an operating position coaxially aligned with the wheel-tire axis A. In the example embodiment illustrated in FIGS. 1 to 6, the filling ring selection and motion apparatus 20 is embodied as a rotatable turret or carousel rotation arrangement 20 having a hub 20A that is rotatably supported on a column 22 that connects an upper part and a lower part of the machine frame 9 to one another. The carousel rotation arrangement 20 further comprises a rotation drive arrangement, for example including an electric drive motor 25 and a rotation drive transmission 26 such as a toothed drive belt 26, a drive chain or a drive gearing. The drive motor 25 may be a high-precision stepper motor or other controlled motor able to achieve a precise rotational positioning of the carousel hub 20.

Figure 6:
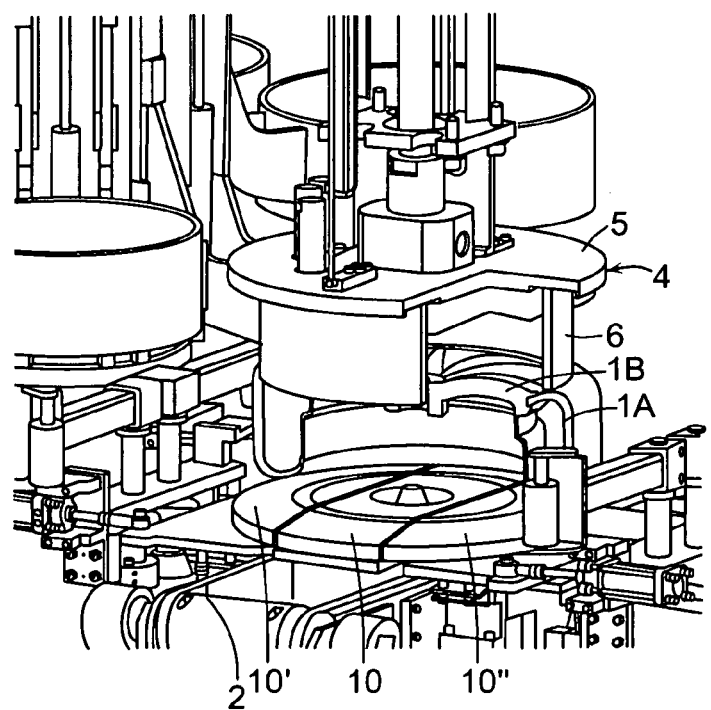
FIG. 6 is a perspective view similar to that of FIGS. 1 and 5, but showing a later stage of operation in which the filling plate and selected filling ring have moved downwardly into contact with the tire sidewall, but before pressing open an annular air filling gap between the wheel rim and the tire sidewall bead.
Figure 7:
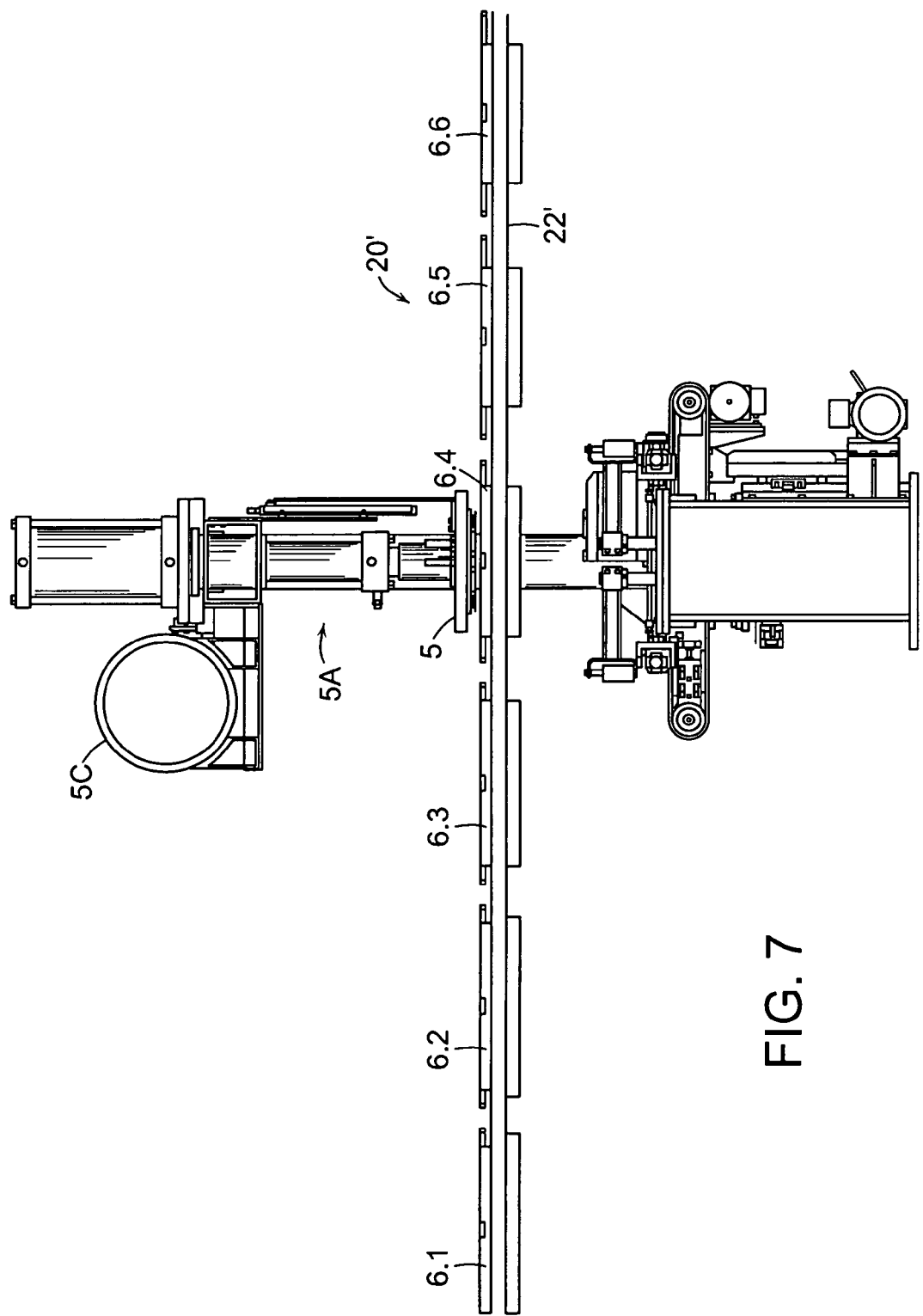
FIG. 7 is a schematic side elevation view of an embodiment of the invention using a linear slide carriage instead of the carousel rotation arrangement for selecting individual tire filling rings.
Figure 8:
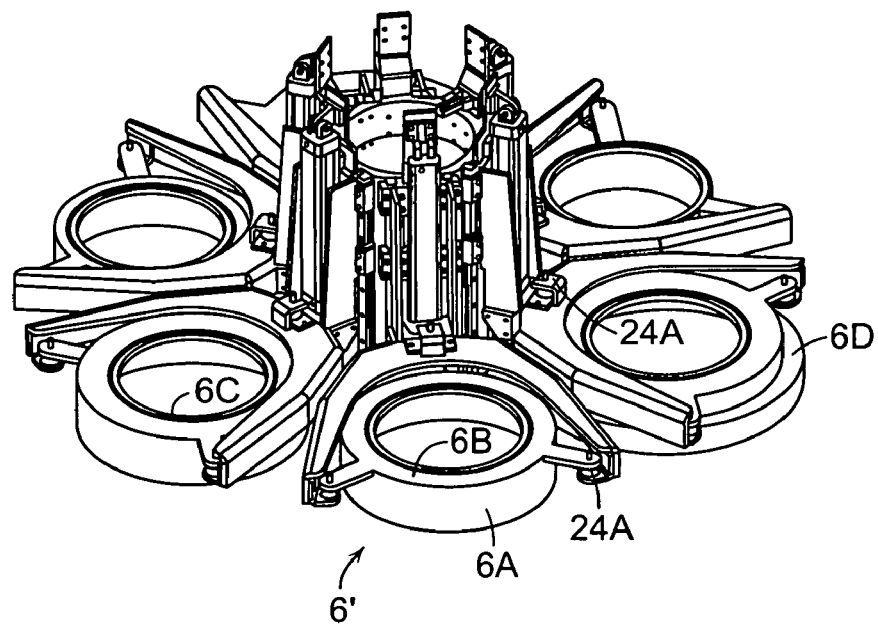
FIG. 8 is a perspective view similar to FIG. 3, but showing a carousel rotation arrangement in a second embodiment of the inventive apparatus in which the tire filling rings each include an annular ring wall and a partially closed top cap forming a bell or dome shape.
Figure 9:
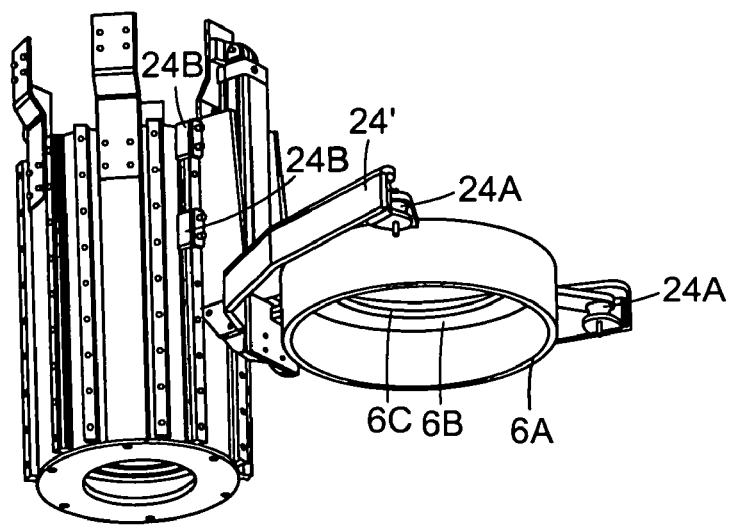
FIG. 9 is a view similar to FIG. 4, but relating to the second embodiment according to FIG. 8.
Figure 10:
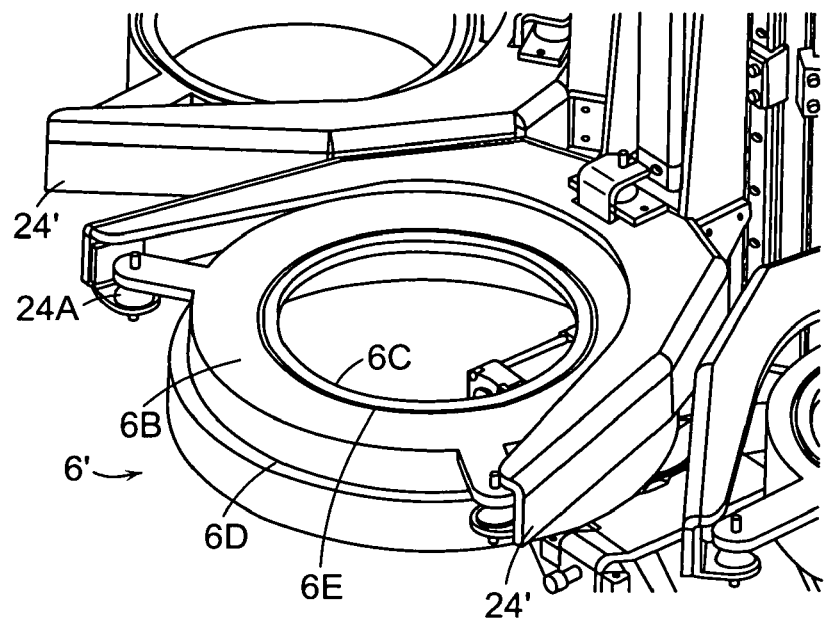
FIG. 10 is a perspective view of a single tire filling ring structure of the second embodiment.

Alternatively, as shown in FIG. 7, the filling ring selection and motion apparatus comprises a linear slide carriage apparatus 20' that carries the several tire filling rings 6.1, 6.2, 6.3, 6.4, 6.5 and 6.6 slidably supported along a linear rail or track arrangement 22' that extends longitudinally preferably along the conveying direction of the transport apparatus 2. The apparatus further comprises a drive arrangement to linearly move the tire filling rings along the rail or track arrangement, so as to bring the respective selected ring into axial alignment with the vertical wheel-tire axis A. At that working position, the ring can be moved vertically downwardly, for example on a vertical slide carriage, similarly as the carousel arrangement 20 of FIGS. 1 to 6, as will be discussed in further detail next. All of the features and operations of the arrangement 20 also apply to the arrangement 20', except for the difference between the rotation motion versus the linear motion.

Referring again especially to FIGS. 2 to 4, the several individual filling rings 6.1 to 6.6 are respectively connected by fork-shaped support arms or brackets 24 to respective slide carriages 27 that are slidably supported in or on respectively two longitudinal axis-parallel guide grooves 23 or guide ridges or rails of the carousel hub 20A. These guide elements 23, e.g. guide grooves or guide rails, extend parallel to the wheel-tire axis A, which is also parallel to the axis of the carousel hub 20A and of the supporting column 22. The slide carriages 27 are respectively slidable along the guide elements 23 parallel to the wheel-tire axis A, so that the respective filling rings 6.1 to 6.6 are also movable along or parallel to the wheel-tire axis A.

Figure 5:
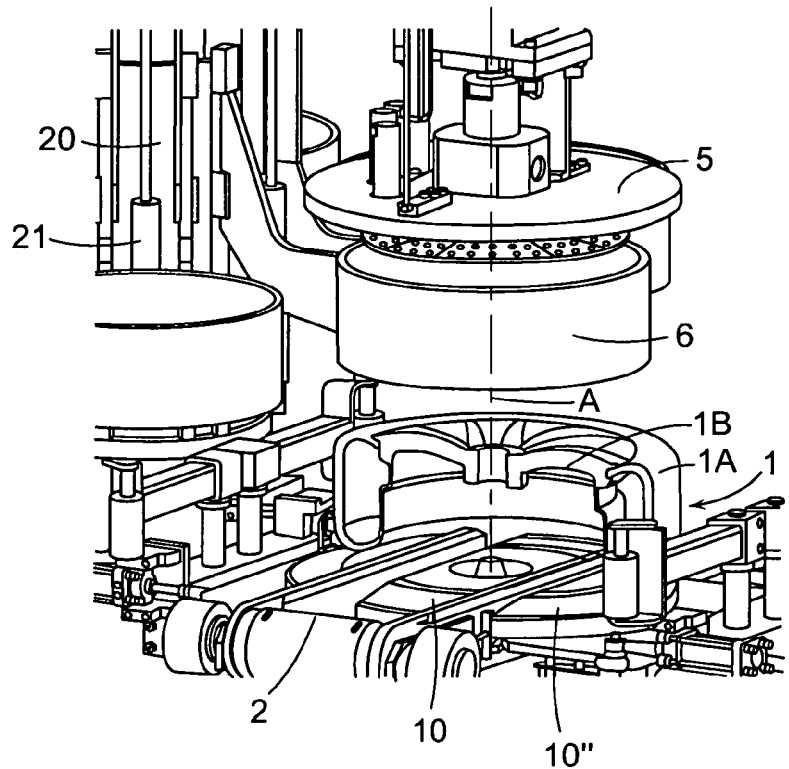
FIG. 5 is a perspective view similar to that of FIG. 1, but showing a slightly earlier stage of operation, after a selected filling ring has been rotated into operating position, but is not yet contacted by and moved downwardly by the filling plate.

In order to align any respective selected one of the filling rings 6.1 to 6.6 coaxially with the wheel-tire axis A, into the operating position shown in FIGS. 1, 5 and 6, the respective center points of all of the filling rings 6.1 to 6.6 must lie along a circle or circular line about the hub axis of the carousel hub 20A. To achieve this, the different-diameter filling rings 6.1 to 6.6 are respectively mounted by the support arms or brackets 24 having different radial extension lengths about the hub axis of the carousel hub 20A (see FIG. 3). Thus, as the carousel hub 20A is rotated, any selected one of the filling rings. 6.1 to 6.6 can be brought into coaxial alignment with the wheel-tire axis A, into the position and arrangement shown in FIG. 5.

Furthermore, each filling ring 6.1 to 6.6, or more specifically, the respective slide carriage 27 carrying the respective filling ring 6, is biased by an upwardly directed biasing force, that urges or pushes the respective filling ring 6 upwardly toward the filling plate 5. This biasing force is applied by a spring arrangement 21 such as a gas spring 21 (or alternatively a metal helical coil spring, an elastic spring arrangement, or any other known spring device). The gas spring 21 may be embodied as a pneumatic cylinder with a permanent air pressure provided to a pressure chamber of the cylinder, or may be pressurized by compressed air from the compressor 65 and/or the compressed air tank 5C. The respective filling ring 6 remains downwardly slidable, in a direction toward the wheel-tire combination 1, against the upwardly directed biasing force of the gas spring 21. However, when no downwardly directed force is applied to the respective filling ring 6, the gas spring 21 pushes the filling ring upwardly into a common or uniform axial position that is the same for all filling rings 6.1 to 6.6. Also, all of the filling rings 6.1 to 6.6 preferably have a common or uniform axial height. To permit the axial sliding of each filling ring 6 while being guided and supported, the respective slide carriage 27 slides guidedly along the longitudinal guide elements 23 of the carousel hub 20A.

To carry out a tire filling procedure, the wheel-tire arrangement 1 has been transported and deposited to lie with a downwardly facing sidewall of the tire on the support and seal arrangement 3 formed of the plate-shaped parts 10, 10' and 10", whereby the tire sidewall forms a seal on the contact seal surface formed thereby, as described above. The wheel size or wheel rim diameter of the wheel-tire combination 1 to be filled is determined or provided as an input. Then, the appropriate filling ring 6 among the available filling rings 6.1 to 6.6 is selected based on its size best matching the wheel size to be serviced. The electric drive motor 25 is actuated and controlled to rotate the carousel hub 20A of the carousel rotation arrangement 20 to the appropriate rotational position to align the selected filling ring 6 among the available filling rings 6.1 to 6.6 coaxially with the wheel-tire axis A, into the position shown in FIG. 5.

Then, the filling plate 5 is moved downwardly, e.g. by actuating the piston-cylinder drive arrangement 5A, until the filling plate 5 comes into air-tight sealed contact with the upper edge rim of the selected filling ring 6, into the position shown in FIG. 1. The upwardly directed biasing force of the gas spring 21 ensures that the filling ring 6 is pressed upwardly against the downwardly moving filling plate 5. This ensures the proper sealed contact of the filling ring 6 against the filling plate 5 (e.g. via the seal ring or disc 5D). Then, the piston-cylinder arrangement 5A continues to move the filling plate 5 downwardly toward the wheel-tire combination 1 along the wheel-tire axis A. Thereby, the tire filling plate 5 pushes the selected tire filling ring 6 downwardly along the wheel-tire axis A against the upward biasing force exerted by the gas spring 21, until the bottom edge rim of the tire filling ring 6 is pressed against the upwardly facing tire sidewall of the tire 1A as shown in FIG. 6. Thereby, the bottom rim edge of the filling ring 6 makes a sealed contact against the tire sidewall. The combination of the filling plate 5 and the filling ring 6 is pushed farther downwardly, so as to press the tire sidewall downwardly away from the wheel rim 1B, until an annular air filling gap opens between the wheel rim and the tire sidewall bead. The penetration depth or further downward travel of the filling ring 6 after contacting the tire sidewall is automatically controlled by a path distance or travel transducer, depending on the filling characteristics of the respective wheel-tire combination 1 being filled, through a wheel type specific filling program that controls the tire filling apparatus.

Now, the actual pressurized air filling of the wheel-tire combination 1 will be carried out by applying compressed air via the compressed air conduit 5B through the tire filling bell 4 formed by the plate 5 and the ring 6. In this regard, the interior chamber space of the tire filling bell 4, the tire interior space, and the seal surface formed by the supporting plate members 10, 10' and 10" bound and define an enclosed space relative to the surrounding environment.

During the course of the tire filling process, the air pressure within the inner space of the tire builds up, and the increasing pressure pushes the upper sidewall of the tire 1A upwardly against the force applied by the piston-cylinder drive arrangement 5A (net of the counter force applied by the biasing spring arrangement 21) via the filling plate 5 and the filling ring 6 until the bead of the tire sidewall contacts and seals against the edge horn or lip of the wheel rim 1B. During this process, the filling ring 6 and the filling plate 5 are pushed upwardly in a cushioning or counter-acting manner as the tire sidewall moves upwardly toward the edge lip of the wheel rim. Through the controlled stroke motion of the tire filling bell 4 formed by the plate 5 and the ring 6, via the piston-cylinder or other drive arrangement 5A, a very high filling accuracy and a good seating of the upper tire sidewall bead against the wheel rim is achieved.

After the filling process has been completed in this manner, the air pressure within the tire filling bell 4 is vented or released through separate release or vent valves that are not referenced in detail. Finally, the filling plate 5 is moved further upwardly by the piston-cylinder device 5A, while the filling ring 6 also moves upwardly to the limited extent of its upward travel by the upwardly directed biasing force applied by the gas spring 21. After reaching the axial position of the filling ring 6 (the stopped maximum axial height of the filling ring 6) as shown in FIG. 1, allowing the further rotation of the carousel rotation arrangement 20, the filling plate 5 separates from the filling ring 6 and continues to move upwardly to its retracted position shown in FIG. 5. Then the filled wheel-tire combination 1 is transported away from the tire filling station. Namely, the lateral plate-shaped parts 10' and 10' of the support and seal arrangement 3 are separated and moved apart from one another, the transport apparatus 2 is lifted upwardly, and the filled wheel-tire combination 1 is then lifted and transported away from the tire filling station 60 by the transport apparatus 2. Then the transport apparatus 2 delivers the next wheel-tire combination into the tire filling station 60 to be filled or inflated.

In a simplified embodiment, the tire filling or inflating station 60 can be constructed as an individual or stand-alone tire filling machine using the inventive multi-part tire filling bell. In this embodiment, the tire filling machine is not provided or equipped with a transport apparatus, but rather the successive wheel-tire combinations are manually placed onto and removed from the tire filling apparatus. In this embodiment, the multi-part construction of the support and seal arrangement 3 can be omitted, i.e. the support and seal arrangement can comprise a single support and seal contact plate. In this embodiment it is also possible to omit the filling ring selection and motion apparatus such as a carousel rotation arrangement 20. Instead, the appropriately sized filling ring can be manually selected among an available plurality of differently sized filling rings, and manually placed on the upwardly facing tire sidewall, to then be pressed downwardly by the tire filling plate.

The filling pressure programs to be carried out for filling any given tire or tires can be selected manually, or controlled through pressure inputs and the like, or via an automated programmed controller.

While not shown, either the central part 10 of the support and seal arrangement 3 may be shaped with an upwardly protruding hump, or an appropriately formed member may be arranged on top of the central part 10, so as to substantially fill out the cup-shaped or bowl-shaped space within the wheel rim 1B supported on the support and seal arrangement 3. Such an arrangement provides for the effective centering and locating of the wheel rim on the central plate-shaped part 10, and also fills out much of the dead air space that would otherwise have to be filled with pressurized air during the filling process described above. Thereby, the economy, efficiency and speed of the filling process can be improved. Nonetheless, in the simplest embodiment, the central part 10 may simply be a flat plate member.

While the above discussion has related to the filling of a tire without the use of a sealing ring, the inventive arrangement can also be used in tire filling stations that carry out the tire filling process with a wheel rim seal ring or seal donut, for example as disclosed in the German Patent DE 198 01 455 mentioned above.

In the first example embodiment illustrated in FIGS. 1 to 6, the tire filling plate 5 is substantially a flat plate (which may have an annular groove around the perimeter thereof receiving a seal member 5D against which the upper edge rim of any one of the filling rings may make sealing contact), and each filling ring 6 is simply a hollow cylindrical annular sleeve like a hollow pipe section. An alternative second embodiment is shown in FIGS. 8 to 11, and generally has the features, functions and operations of the first embodiment as described above, except for differences that will be explained now in connection with a slightly different structure of the filling bell 4'.

In this second embodiment of FIGS. 8 to 11, each filling ring 6' or filling chamber member includes an annular cylindrical sleeve or ring wall 6A, or a stepped-diameter ring wall 6D, and an at least partially closed top plate or top cap 6B having a first opening 6C therein. The ring wall 6A or 6D has an open bottom end forming a second opening bounded by a bottom edge rim. Thus, each filling ring 6' in such an embodiment has a configuration of an inverted bowl, or of a bell or dome. An air feed and pressing member 5', like a smaller-diameter filling plate 5, makes sealing contact on a seal ring 6E around the first opening 6C in the top cap 6B of the filling ring 6'.

While the bottom second openings of the several filling rings 6' have respective different diameters, the top first openings 6C of the several filling rings 6' preferably all have the same common diameter, which simplifies the sealed fitting of the air feed and pressing member 5' thereto. In this regard, the stepped-diameter ring wall 6D accommodates the largest wheel size or sizes, while still keeping the same size of the first opening 6C common to all of the other tire filling rings 6'.

Figure 11:
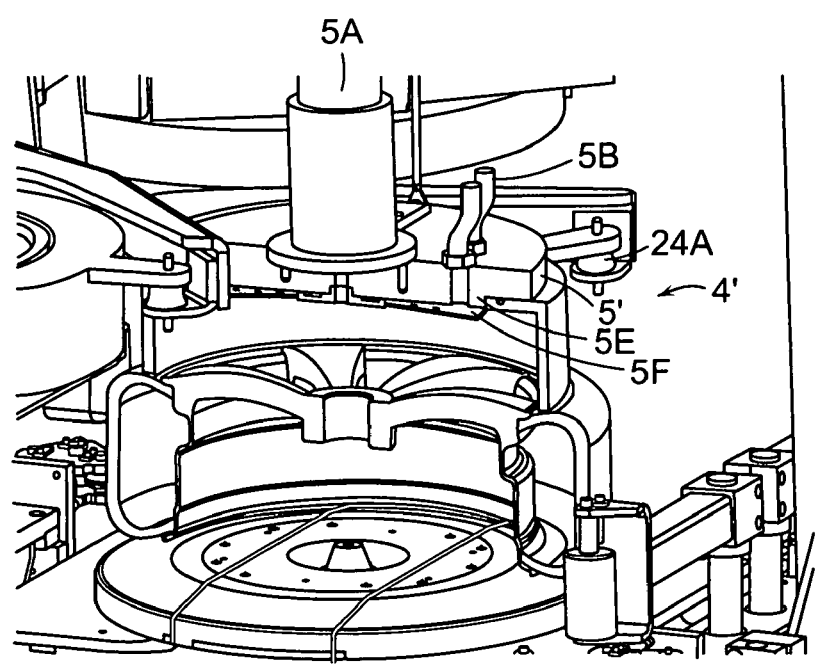
FIG. 11 is a view similar to FIG. 6, but relating to the second embodiment according to FIGS. 8 to 10.

The air feed and pressing member or filling plate 5' is connected to the lower end of the piston-cylinder device 5A and is also connected to the pressurized air supply conduits 5B, which communicate through the plate 5'. When the selected filling ring 6' is moved into the operating position, the air feed and pressing member 5' is moved downwardly by the piston-cylinder device 5A to make sealing contact on the seal ring 6E around the opening 6C of the top cap 6B of the filling ring 6', and then press the filling ring 6' downwardly as shown in FIG. 11, substantially by-the same process as shown in FIGS. 1 and 6.

Preferably, to facilitate the coaxial alignment of the filling plate 5' with the opening 6C of the filling ring 6' and positively form-lock the coaxially aligned and mated condition, the filling plate 5' includes a downward protrusion 5E that mates or plugs fittingly into the opening 6C. This plugged-together and sealed condition of the filling ring 6' and the filling plate 5' forms a closed or completed filling bell 4'. Further preferably, to assist in the coaxial alignment of the components, the protrusion 5E preferably includes or extends into a downwardly tapering conical centering section 5F, which may include an air distributor or baffle plate. Slight radial misalignments of the filling plate 5' relative to the filling ring 6' off of the vertical axis A are overcome by the conical centering section 5F homing into the fitting opening 6C.

Further in this regard, each filling ring 6' is preferably supported via an elastic suspension arrangement, including elastic support blocks or cushions 24A, preferably at three circumferentially evenly distributed locations, via which the filling ring 6' is supported on support arms or brackets 24'. Alternatively, the support brackets 24' are supported or connected via elastic members 24B to the slide carriage 27. This elastic suspension allows slight tilting of the filling ring 6' relative to the wheel-tire axis A (e.g. tilting out of the horizontal plane), and also a slight lateral shifting in directions perpendicular to the wheel-tire axis A (e.g. shifting in the horizontal plane). These elastic yielding or shifting abilities allow the filling ring 6' to move slightly to compensate or adapt to slight angular tilt misalignments and slight radial off-axis misalignments between the filling plate 5' (particularly the protrusion 5E) and the filling ring 6' (particularly the top cap 6B and the opening 6C thereof), as the conical centering section 5F moves into the opening 6C. Thereby the positive form-fitting and air-tight sealed connection between the components can be surely and reliably achieved.

The term operating position can include all locations along the wheel-tire axis or reference axis A, and is not limited to a single-point position. While in the operating position, the tire filling ring can move to several successive locations along the axis A. The terms coaxial and coaxially aligned do not require perfect coaxial alignment, but rather allow for normal operating tolerances, variations and misalignments from a nominal coaxial alignment.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A tire filling apparatus adapted to fill air into a wheel-tire combination including a tire mounted on a wheel rim, said tire filling apparatus comprising:
   a support arrangement adapted to support a first side surface of the wheel-tire combination thereon, and
   a tire filling bell arranged opposite said support arrangement so as to receive the wheel-tire combination between said tire filling bell and said support arrangement;
   wherein:
   said tire filling bell comprises a tire filling plate and a first tire filling ring separate from said tire filling plate,
   said tire filling plate is arranged spaced apart from said support arrangement and movable along a reference axis that extends through said support arrangement and said tire filling plate,
   said first tire filling ring is movable into an operating position coaxially centered on said reference axis between said support arrangement and said tire filling plate, and
   said tire filling plate and said first tire filling ring in said operating position are arranged so that said tire filling plate is adapted to move toward said support arrangement along said reference axis so as to contact a first end of said first tire filling ring, and then said tire filling plate and said first tire filling ring together are adapted to move toward said support arrangement along said reference axis so that a second end of said first tire filling ring opposite said first end is adapted to contact a second side surface of the wheel-tire combination opposite the first side surface of the wheel-tire combination.

2. The tire filling apparatus according to claim 1, wherein said reference axis coincides with a wheel axis of the wheel-tire combination supported on and arranged in sealing contact with said support arrangement.

3. The tire filling apparatus according to claim 1, further comprising an active powered drive device connected to said tire filling plate and adapted to drive said tire filling plate toward said support arrangement, and a biasing spring device connected to said first tire filling ring to exert on said first tire filling ring a biasing force directed away from said support arrangement, wherein said active powered drive device is adapted to drive said tire filling plate so as to push said first tire filling ring toward said support arrangement against said biasing force.

4. The tire filling apparatus according to claim 3, not including any active powered drive device that is connected to said first tire filling ring and adapted to drive said first tire filling ring toward said support arrangement.

5. The tire filling apparatus according to claim 1, further comprising a pressurized air supply line connected to said tire filling plate and communicating through said tire filling plate into a bell chamber space bounded by said first tire filling ring and said tire filling plate.

6. The tire filling apparatus according to claim 1, further comprising a second tire filling ring that has a diameter different from said first tire filling ring and that is selectively movable into said operating position instead of said first tire filling ring.

7. The tire filling apparatus according to claim 6, wherein said first and second tire filling rings are not concentric with one another and are not nested one within another.

8. The tire filling apparatus according to claim 1, wherein:
   said first tire filling ring comprises an annular cylindrical ring wall with a first opening bounded by a first edge rim of said ring wall at said first end and with a second opening bounded by a second edge rim of said ring wall at said second end;

said first opening and said second opening both have the same diameter; and said tire filling plate is adapted to directly contact and seal against said first edge rim and said second edge rim is adapted to directly contact and seal against the second side surface of the wheel-tire combination in said operating position.

9. The tire filling apparatus according to claim 1, wherein:

said first tire filling ring comprises an annular ring wall and a cap air-tightly joined to said ring wall at said first end;

said cap has a first opening therein;

said ring wall has a second opening bounded by an edge rim of said ring wall at said second end;

said first opening has a smaller diameter than said second opening; and said tire filling plate is adapted to contact and seal against said cap around said first opening and said edge rim of said ring wall is adapted to contact and seal against the second side surface of the wheel-tire combination in said operating position.

10. The tire filling apparatus according to claim 9, wherein said ring wall is an annular cylindrical ring wall having a single uniform ring diameter over all of said ring wall.

11. The tire filling apparatus according to claim 9, wherein said ring wall is a stepped-diameter ring wall including at least two ring wall portions that respectively have different ring diameters and that are arranged axially adjoining one another.

12. The tire filling apparatus according to claim 9, wherein said tire filling plate includes a plate member and a protrusion that protrudes from said plate member, and wherein said protrusion is sized and shaped and positioned to be fitted into said first opening in said cap in said operating position.

13. The tire filling apparatus according to claim 12, wherein said protrusion includes or extends into a conical centering section that tapers conically to a diameter smaller than said first opening toward said support arrangement.

14. The tire filling apparatus according to claim 1, further comprising an elastic suspension arrangement that carries said first tire filling ring so as to allow said first tire filling ring to move within a limited motion range laterally relative to said reference axis and to tilt within a limited angular range relative to a plane normal to said reference axis.

15. A tire filling apparatus adapted to fill air into a wheel-tire combination including a tire mounted on a wheel rim, said tire filling apparatus comprising:

a support arrangement adapted to support a first side surface of the wheel-tire combination thereon, a tire filling plate arranged spaced apart from said support arrangement and movable along a reference axis that extends through said support arrangement and said tire filling plate, and a plurality of tire filling rings that respectively have different diameters and that are movable so that each respective selected filling ring among said tire filling rings can be selectively individually moved into and out of an operating position coaxially centered on said reference axis between said support arrangement and said tire filling plate, wherein said respective filling ring is adapted and positioned to have a first end thereof with a first opening temporarily pressed and sealed against said tire filling plate and a second end thereof with a second opening temporarily pressed and sealed against a second side surface of the wheel-tire combination opposite the first side surface of the wheel-tire combination in said operating position.

16. The tire filling apparatus according to claim 15, further comprising a pressurized air supply line connected to said tire filling plate and communicating through said tire filling plate into a bell chamber space temporarily formed and bounded by said respective filling ring and said tire filling plate.

17. The tire filling apparatus according to claim 15, wherein each one of said tire filling rings is a respective hollow annular cylindrical sleeve or pipe section having two opposite open ends forming said first and second openings respectively encircled by first and second edge rims of said cylindrical sleeve or pipe section respectively at said first and second ends thereof.

18. The tire filling apparatus according to claim 15, wherein:

each said filling ring respectively comprises an annular ring wall and a cap air-tightly joined to said ring wall at said first end;

said cap has said first opening therein;

said ring wall has said second opening bounded by an edge rim of said ring wall at said second end;

said first opening has a smaller diameter than said second opening; and said tire filling plate is adapted to contact and seal against said cap around said first opening and said edge rim of said ring wall is adapted to contact and seal against the second side surface of the wheel-tire combination in said operating position.

19. The tire filling apparatus according to claim 15, wherein said plurality of said tire filling rings comprises at least three of said tire filling rings movably arranged along a line extending transversely relative to said reference axis, so that each said respective selected filling ring can be selectively individually moved into and out of said operating position centered on said reference axis.

20. The tire filling apparatus according to claim 19, wherein said line is a circular arcing line.

21. The tire filling apparatus according to claim 19, wherein said line is a straight linear line.

22. The tire filling apparatus according to claim 19, wherein said plurality of said tire filling rings includes exactly six of said tire filling rings.

23. The tire filling apparatus according to claim 19, wherein said different diameters of said tire filling rings respectively have a minimum diameter difference of 2 inches relative to one another.

24. The tire filling apparatus according to claim 19, wherein said plurality includes a number of said tire filling rings corresponding to one half of a number of differently sized ones of the wheel-tire combinations that are to be filled using said apparatus.

25. The tire filling apparatus according to claim 15, wherein said tire filling rings are not concentric with one another and are not nested one within another.

26. The tire filling apparatus according to claim 15, further comprising a filling ring selection and motion arrangement on which said tire filling rings are arranged, and which is adapted to move each said respective selected filling ring selectively individually into and out of said operating position.

27. The tire filling apparatus according to claim 26, wherein said filling ring selection and motion arrangement comprises a carousel rotation arrangement including a rotatable hub and support brackets that connect said tire filling rings to said rotatable hub so that said tire filling rings lie on a circular line around said rotatable hub.

28. The tire filling apparatus according to claim 27, wherein said circular line is concentric about a rotation axis of said rotatable hub, and said support brackets respectively have different radial protrusion lengths from said rotation axis so that respective ring centers of said tire filling rings all lie on said circular line.

29. The tire filling apparatus according to claim 26, wherein said filling ring selection and motion arrangement comprises a linearly movable carriage arrangement including a linearly movable carriage and support brackets that connect said tire filling rings to said carriage so that said tire filling rings lie on a linear line extending transversely to said reference axis through said operating position.

30. The tire filling apparatus according to claim 26, wherein said tire filling rings are movably connected to said filling ring selection and motion arrangement so that said tire filling rings are axially slidable parallel to said reference axis, and wherein said filling ring selection and motion arrangement includes at least one biasing spring device that biases and urges said tire filling rings axially away from said support arrangement toward an axial resting position.

31. The tire filling apparatus according to claim 26, further comprising an elastic suspension arrangement that respectively connects each one of said tire filling rings to said filling ring selection and motion arrangement so as to allow each said respective filling ring to move within a limited motion range laterally relative to said reference axis and to tilt within a limited angular range relative to a plane normal to said reference axis so as to be able to compensate misalignments between said tire filling plate and said respective filling ring in said operating position.

32. The tire filling apparatus according to claim 15, wherein said support arrangement comprises a multi-part support and seal arrangement including plural support and seal members that can be selectively separated from one another and sealingly contacted with one another to form a sealed support and seal surface on which the first side surface of the wheel-tire combination can be supported and sealed.

33. A combination comprising the tire filling apparatus according to claim 15, at least one further wheel-tire measuring or processing apparatus, and a wheel-tire transport mechanism linking said apparatuses to one another so as to form thereof a tire mounting system or a wheel balancing system.

34. A tire filling apparatus adapted to fill air into a wheel-tire combination including a tire mounted on a wheel rim, said apparatus comprising:
a support arrangement adapted to sealingly contact and support a first side surface of the wheel-tire combination thereon;
an air feed and pressing member that is arranged spaced apart from said support arrangement and is movable along a reference axis that extends through said support arrangement and said air feed and pressing member;
an active powered drive device that is connected to said air feed and pressing member and is adapted to drive said air feed and pressing member linearly along said reference axis toward said support arrangement;
a pressurized air supply line that is connected to and communicates through said air feed and pressing member;
a movable support that is rotatable about a rotation axis parallel to said reference axis or slidable along a slide line that extends in a plane transverse to said reference axis;
a plurality of filling chamber members that each respectively have a first opening and a second opening at opposite ends thereof and that respectively have different diameters of said second openings;
a plurality of axial slide carriages and support brackets that axially slidably connect said filling chamber members to said movable support so as to be axially slidable parallel to said reference axis; and
at least one biasing spring device acting on said axial slide carriages and/or said support brackets to axially bias said filling chamber members parallel to said reference axis in a direction away from said support arrangement;
wherein said movable support is adapted to rotate about said rotation axis or slide along said slide line so as to move any selected filling chamber member of said filling chamber members selectively into an operating position coaxially centered on said reference axis between said support arrangement and said air feed and pressing member, and wherein said active powered drive device is adapted to drive said air feed and pressing member toward said support arrangement with said selected filling chamber member received between said air feed and pressing member and a second side surface of the wheel-tire combination opposite the first side surface, and with said air feed and pressing member pressed and sealed onto said first opening of said selected filling chamber member and said second opening of said selected filling chamber member pressed and sealed onto the second side surface of the wheel-tire combination.

35. The tire filling apparatus according to claim 34, wherein said air feed and pressing member comprises a flat plate, said filling chamber members respectively consist of hollow annular cylindrical rings, and any selected one of said rings and said flat plate together form a tire filling bell.

36. The tire filling apparatus according to claim 34, wherein said filling chamber members respectively each comprise a hollow annular ring and a cap on one end thereof with said first opening provided in said cap, said first openings of said filling chamber members respectively all have a same common diameter, and said air feed and pressing member comprises a plate arranged and adapted to be pressed against said cap and a protrusion arranged and adapted to be fitted into said first opening.

37. A method of filling air into a wheel-tire combination including a tire mounted on a wheel rim, said method comprising the following steps:
a) supporting and air-tight sealing a first side surface of said tire of said wheel-tire combination;
b) moving a tire filling ring into an operating position concentrically centered on a wheel axis of said wheel-tire combination adjacent to a second side surface of said tire opposite said first side surface thereof;
c) moving a tire filling plate axially along said wheel axis toward said wheel-tire combination so as to press and seal said tire filling plate against a first end of said tire filling ring and to press and seal a second end of said tire filling ring against said second side surface of said tire, such that said tire filling plate and said tire filling ring together form a tire filling bell bounding a tire filling bell chamber;
d) pressing said second end of said tire filling ring against said second side surface sufficiently to open an annular air gap between said wheel rim and said second side surface of said tire; and
e) filling pressurized air via said tire filling bell chamber through said annular air gap into an interior of said tire.

38. The method according to claim 37, wherein said step c) comprises first moving said tire filling plate into contact with said first end of said tire filling ring, and then moving said tire filling plate and said tire filling ring together toward said second side surface of said tire.

39. The method according to claim 37, further comprising, before said step b), preliminary steps of providing a plurality of rings having respective different diameters, and selecting said tire filling ring as one of said plurality of rings depending on a diameter of said wheel-tire combination that is to be filled.

40. The method according to claim 37, further comprising, before said step a), a preliminary step of preparing a support surface by air-tightly joining together plural support members, and said step a) comprises supporting said first side surface on said support surface.

\* \* \* \* \*